(12) United States Patent
Heo

(10) Patent No.: US 9,842,267 B2
(45) Date of Patent: Dec. 12, 2017

(54) METHOD AND APPARATUS FOR MONITORING DRIVER STATUS USING HEAD MOUNTED DISPLAY

(71) Applicant: HYUNDAI MOTOR COMPANY, Seoul (KR)

(72) Inventor: Keun Hang Heo, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 225 days.

(21) Appl. No.: 14/684,303

(22) Filed: Apr. 10, 2015

(65) Prior Publication Data

US 2016/0148064 A1   May 26, 2016

(30) Foreign Application Priority Data

Nov. 20, 2014   (KR) ........................ 10-2014-0162338

(51) Int. Cl.
   *G06K 9/00*   (2006.01)

(52) U.S. Cl.
   CPC ................. *G06K 9/00845* (2013.01)

(58) Field of Classification Search
   CPC ............................ G06K 9/00845; G08B 21/06
   See application file for complete search history.

(56) References Cited

U.S. PATENT DOCUMENTS

| | | |
|---|---|---|
| 7,401,920 B1 | 7/2008 | Kranz et al. |
| 2003/0142041 A1 | 7/2003 | Barlow et al. |
| 2013/0021463 A1* | 1/2013 | Hatakeyama ............ A61B 5/18 348/78 |
| 2014/0139655 A1* | 5/2014 | Mimar ............... G08B 21/0476 348/77 |
| 2014/0210625 A1* | 7/2014 | Nemat-Nasser ..... B60K 28/066 340/575 |
| 2014/0211319 A1* | 7/2014 | Park ....................... G02B 27/01 359/630 |
| 2014/0375785 A1* | 12/2014 | Kogut .................. A61B 5/0075 348/77 |

(Continued)

FOREIGN PATENT DOCUMENTS

| | | |
|---|---|---|
| EP | 2 246 831 A1 | 11/2010 |
| JP | 09-218375 A | 8/1997 |
| JP | 2004-219664 A | 8/2004 |

(Continued)

OTHER PUBLICATIONS

Korean Office Action dated Nov. 2, 2015 issued in Korean Patent Application No. 10-2014-0162338.

(Continued)

*Primary Examiner* — Mehrdad Dastouri
*Assistant Examiner* — Rowina Cattungal
(74) *Attorney, Agent, or Firm* — McDermott Will & Emery LLP

(57) ABSTRACT

A method for monitoring a driver status in a terminal which interworks with a vehicle head unit through local wireless communication includes receiving vehicle proceeding direction information from the vehicle head unit. Whether or not a driver's gaze deviates from a gaze stability area is determined using the vehicle proceeding direction information. A driver's gaze deviation warning message is transmitted to the vehicle head unit, upon determining that the driver's gaze deviates from the gaze stability area.

19 Claims, 5 Drawing Sheets

(56) References Cited

U.S. PATENT DOCUMENTS

2016/0070966 A1* 3/2016 Yang ............... G06K 9/00335
345/8

FOREIGN PATENT DOCUMENTS

| | | |
|---|---|---|
| JP | 2005-153660 A | 6/2005 |
| JP | 2008-097278 A | 4/2008 |
| JP | 2011-128799 A | 6/2011 |
| JP | 2012-137639 A | 7/2012 |
| JP | 2014-211787 A | 11/2014 |
| KR | 10-2012-0075672 A | 7/2012 |

OTHER PUBLICATIONS

Korean Notice of Allowance dated Apr. 4, 2016 issued in Korean Patent Application No. 10-2014-0162338.

* cited by examiner

METHOD AND APPARATUS FOR MONITORING DRIVER STATUS USING HEAD MOUNTED DISPLAY

CROSS REFERENCE TO RELATED APPLICATION

This application claims the benefit of priority to Korean Patent Application No. 10-2014-0162338, filed on Nov. 20, 2014, which is hereby incorporated by reference as if fully set forth herein.

TECHNICAL FIELD

The present disclosure relates to a method and apparatus for monitoring a driver status, and more particularly, to a method and apparatus for monitoring a driver status using a head mounted display (HMD) in which the status of a driver may be monitored using a wearable glasses device.

BACKGROUND

Rapid development of information technology (IT) influences the automobile industry, and thus, various IT techniques are applied to vehicles.

Further, in order to secure safety in vehicle driving, various safe driving assistance functions may be provided to the vehicles.

Wearable devices can be worn by people to perform computing operation. Recently, the wearable devices having a mobile function and various sensing functions as well as a multimedia reproducing function have entered the market.

The wearable devices may include a smart watch as a wristwatch, wearable glasses as goggles, and an arm band wearable device.

It is important that the wearable devices applicable to safe driving do not disturb driving safety and are used while allowing a driver to focus his/her eyes forward without distribution of a driver's gaze.

A wearable device applied to a driver status monitoring (DSM) system which detects a driver status during driving and performs specific measures, for example, outputs a warning and alarm message, requires various sensors to detect the driver status, a communication module for information transmission/reception to/from an external apparatus, a display, a camera, etc.

However, an effective wearable device relating to safe driving of a vehicle is not currently available.

SUMMARY

The present disclosure is directed to a method and apparatus for monitoring a driver status using a head mounted display (HMD) that substantially obviates one or more problems due to limitations and disadvantages of the related art.

An aspect of the present inventive concept provides a method and apparatus for monitoring a driver status using an HMD.

Another aspect of the present inventive concept provides a method and apparatus for monitoring a driver status using an HMD which may monitor the driver status in real time, judge whether or not a driver's gaze deviates from a gaze stability area, and notify the driver of deviation of the driver's gaze.

Yet another aspect of the present inventive concept provides a method and apparatus for monitoring a driver status using an HMD which may adaptively calculate a gaze deviation allowable angle according to whether or not vehicle rotation is necessary during guidance of driving and determine whether or not a driver's gaze deviates from a gaze stability area using the calculated gaze deviation allowable angle.

Additional advantages, objects, and features of the disclosure will be set forth in part in the description which follows and in part will become apparent to those having ordinary skill in the art upon examination of the following or may be learned from practice of the invention. The objectives and other advantages of the disclosure may be realized and attained by the structure particularly pointed out in the written description and claims hereof as well as the appended drawings.

According to an exemplary embodiment of the present inventive concept, a method for monitoring a driver status in a terminal which interworks with a vehicle head unit through local wireless communication includes receiving vehicle proceeding direction information from the vehicle head unit by a controller. Whether or not a driver's gaze deviates from a gaze stability area is determined using the vehicle proceeding direction information by the controller. A driver's gaze deviation warning message is transmitted to the vehicle head unit by the controller, upon judging that the driver's gaze deviates from the gaze stability area.

A non-transitory computer readable recording medium comprising computer executable instructions of which cause the controller to implement the method is provided.

According to another exemplary embodiment of the present inventive concept, a non-statutory computer-readable medium comprising executable instructions which cause an apparatus for monitoring a driver status by interworking with a vehicle head unit through local wireless communication to perform following functions. Vehicle proceeding direction information is received from the vehicle head unit. Whether or not a driver's gaze deviates from a gaze stability area is determined using the vehicle proceeding direction information. A driver's gaze deviation warning message is transmitted to the vehicle head unit, upon judging that the driver's gaze deviates from the gaze stability area.

According to yet another exemplary embodiment of the present inventive concept, a system for monitoring a driver status, the system includes a vehicle head unit configured to sense a vehicle proceeding direction and to transmit information regarding the sensed vehicle proceeding direction through local wireless communication. A terminal is configured to receive the information regarding the vehicle proceeding direction through the local wireless communication, to determine whether or not a driver's gaze deviates from a gaze stability area using the received information regarding the vehicle proceeding direction information, and to transmit a driver's gaze deviation warning message to the vehicle head unit as a result of determination.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the inventive concept and together with the description serve to explain the principle of the invention.

DETAILED DESCRIPTION

Reference will now be made in detail to the exemplary embodiments of the present inventive concept, examples of which are illustrated in the accompanying drawings. The suffixes "module" and "unit" in elements used in the description below are given or used together only in consideration of ease in preparation of the specification and do not have distinctive meanings or functions.

Hereinafter, although one embodiment of the present inventive concept illustrates all elements as being combined, embodiments of the present inventive concept are not limited thereto. That is, one or more of all the elements may be selectively combined within the scope of the invention. Further, all the elements may be respectively implemented by independent pieces of hardware, or some of the elements may be selectively combined and thus implemented by a computer program having a program module performing the functions of the combined elements in a plurality of pieces of hardware. Code and code segments constituting the computer program may be easily deduced by those skilled in the art. Such a computer program is stored in a computer readable storage medium, and read and executed by a computer, thus being capable of implementing embodiments of the present inventive concept. Storage media of computer programs may include a magnetic recording medium, an optical recording medium, a carrier wave medium, etc.

Further, it will be understood that the terms "including," "constituting," or "having" in the description means that a corresponding element may be included and other elements than the element may be further included. It will be understood that all terms including technical or scientific terms have the same meanings as generally understood by those skilled in the art. The generally used terms, such as the terms defined in a dictionary, may be interpreted as having meanings coinciding with the meanings used in the art, and may not be interpreted as having ideal or excessively formal meanings.

Further, in description of elements of the present invention, the terms "first," "second," "A," "B," "(a)," "(b)," etc. may be used. These terms are used only to discriminate one element from other elements, and the nature, order, or sequence of the corresponding element is not limited by these terms. If it is stated that an element is "connected to," "combined with," or "coupled with" another element, it will be understood that the former may be directly connected to or combined with the latter or other elements may be intervened between the two elements.

Figure 1:
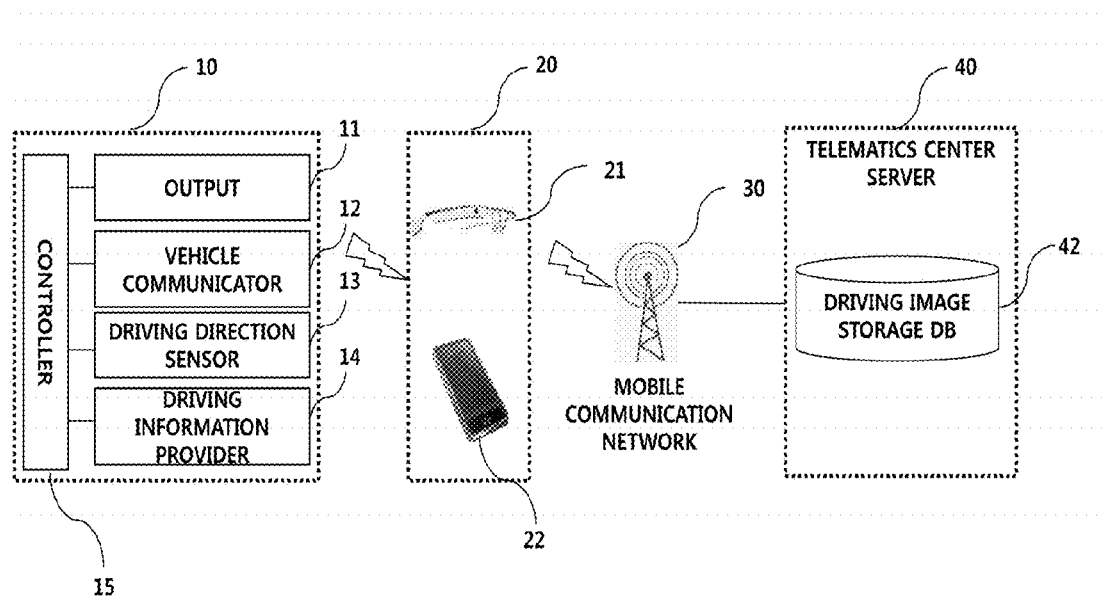
FIG. 1 is a view of a system for monitoring a driver status in accordance with the present disclosure.

FIG. 1 is a view of a system for monitoring a driver status in accordance with the present inventive concept.

With reference to FIG. 1, the system may include a vehicle head unit 10, a user terminal 20, a mobile communication network 30, and a telematics center server 40. These elements shown in FIG. 1 are not essential, and thus, the system may include elements provided in number greater than or less than these elements.

The vehicle head unit 10 may communicate with the user terminal 20 through local wireless communication connection. The local wireless communication may include Wi-Fi communication, Bluetooth communication, infrared data association (IrDA), ultrawideband (UWB) communication, ZigBee communication, radio frequency identification (RFID) communication, etc. in a vehicle.

The vehicle head unit 10 in accordance with the present disclosure may include an output 11, a vehicle communicator 12, a driving direction sensor 13, a driving information provider 14, and a controller 15.

The output 11 may generate visual, auditory, or tactile senses output and include a display module, a sound output module, an alarm module, and the like.

The display module displays and outputs information processed by the vehicle head unit 10. For example, if the vehicle head unit 10 is in a driving guidance mode, the display module displays a user interface (UI) or a graphical user interface (GUI) relating to guidance of driving. If the vehicle head unit 10 is in a telephone call mode, the display module displays a UI or a GUI relating to telephone call. If the vehicle head unit 10 is in a multimedia reproduction mode, the display module displays a UI or a GUI relating to multimedia reproduction. If the vehicle head unit 10 is in a camera image display mode, the display module may display an image acquired by a camera mounted in the vehicle. Particularly, the display module in accordance with the present disclosure, if deviation of a driver's gaze is confirmed, the display module may display a designated warning message on a screen.

The display module may include at least one of a liquid crystal display (LCD), a thin film transistor-liquid crystal display (TFT LDC), an organic light emitting diode (PLED), a flexible display, and a 3D display.

Thereamong, some displays may be a transparent display or a light-transmitting display to see the outside therethrough. The transparent display may include a transparent LCD. The rear structure of the display module may be a light-transmitting structure. By such a structure, a user may see an object located at the rear of the display module through an area of the body of the vehicle head unit 10, occupied by the display module.

Two or more display modules may be provided according to a vehicle center fascia. For example, a plurality of display modules may be disposed on one surface of the vehicle center fascia to be separated from each other or integrally, or be disposed on different surfaces of the vehicle center facia.

If the display module and a sensor sensing a touch operation (hereinafter, referred to as a "touch sensor") form a layered structure (hereinafter, abbreviated to as a "touchscreen"), the display module may be used as an input device as well as an output device.

For example, the touch sensor may have the form of a touch film, a touch sheet, a touch pad, and the like.

The touch sensor may covert change in pressure applied to a specific region of the display module or capacitance generated from a specific region of the display module into an input signal. The touch sensor may be configured to detect not only a position or an area of a touched region but also pressure when the region is touched.

If there is a touch input of the touch sensor, signal(s) corresponding thereto are transmitted to a touch controller. The touch controller processes the signal(s) and then transmits corresponding data to the controller 15. Thereby, the controller 15 may detect which region of the display module is touched.

The sound output module may produce multimedia, guide driving information, and output sound according to reception of various warning/alarm messages and reception of a call signal. The sound output module may include a receiver, a speaker, a buzzer, and the like. Further, the sound output module may output sound through an earphone jack provided on the vehicle head unit 10 or provided at one side of the vehicle center fascia.

The alarm module outputs a signal of informing occurrence of a specific event through the vehicle head unit 10. Here, events occurring on the vehicle head unit 10 include reception of a call signal, reception of a text message, input of a key signal, input of touch, and the like. Particularly, the alarm module in accordance with the present disclosure may generate and output a designated warning alarm signal, when deviation of the driver's gaze is sensed.

The alarm module may interwork with a vibration module mounted at one side of a driver's seat. For example, when the deviation of the driver's gaze is sensed, the alarm module may transmit a designated control signal to the vibration module, and the vibration module may drive a vibration motor so that the driver's seat may be vibrated. Then, the driver may to focus his/her eyes forward through seat vibration.

Further, the alarm module may output a signal of other types, in addition to a video signal or an audio signal, for example, a signal informing of occurrence of an event through vibration. The video signal or the audio signal may be output through the display module or the sound output module. Further, the alarm module may inform of occurrence of a specific event through change in illumination on the display screen and light emitted from a camera flash.

The vehicle communicator 12 may transmit/receive data to/from the user terminal 20 through local wireless communication connection. Further, the vehicle communication unit 12 may transmit and receive information to and from the telematics center server 40 through connection with the mobile communication network 30.

The driving direction sensor 13 senses a current driving (proceeding) direction of the vehicle which is set as a reference to determine the deviation of the driver's gaze using a geomagnetic field sensor.

The driving information provider 14 determines whether or not vehicle rotation in a front area is necessary during guidance of driving and informs a determination result. For example, if the vehicle rotation in the front area is necessary, the driving information provider 14 may calculate a rotating direction and a rotating angle and transmit the calculated rotating direction and rotating angle to the controller 15.

The controller 15 may perform overall control of the vehicle head unit 10. Particularly, if the vehicle driving direction is changed by a reference value or more, the controller 15 may transmit a designated control signal to the user terminal 20 in order to inform that the driving direction of the vehicle is changed.

Further, if necessity for vehicle rotation during guidance of driving is sensed, the controller 15 in accordance with the present disclosure may transmit the designated control signal including the rotating direction and the rotating angle to the user terminal 20.

The mobile communication network 30 may provide a mobile communication connection service between the user terminal 20 and the telematics center server 40 and/or the vehicle head unit 10 and the telematics center server 40. The mobile communication network 30 may support at least one wireless communication standard of Wideband Code Division Multiple Access (WCDMA), High Speed Packet Access (HSPA), and Long Term Evolution (LTE)/LTE-Advanced.

The telematics center server 40 may communicate with the vehicle head unit 10 and/or the user terminal 10 through the mobile communication network 30. Particularly, if the deviation of the driver's gaze is sensed by the user terminal 20, the telematics center server 40 may receive an image acquired by the user terminal 40. The received image may be stored in a driving image storage database 42.

Further, the telematics center server 40 may read the stored image from the driving image storage database 42 according to request of the user terminal 20 and/or the vehicle head unit 10 and transmit the image to the user terminal 20 and/or the vehicle head unit 10.

The user terminal 20 applied to the present disclosure may include a wearable glasses device 21 (hereinafter, used together with a head mounted device (HMD) and wearable glasses) and/or a smartphone 22.

If a mobile communication module is provided in the HMD 21, the HMD 21 may communicate directly with the telematics center server 40 through the mobile communication network 30. On the other hand, if a mobile communication module is not provided in the HMD 21, the HMD 21 may set the smartphone 22 as a hotspot or an access point and then communicate with the telematics center server 40. The HMD 21 and the smartphone 22 may be connected through local wireless communication, such as Bluetooth.

Further, if a local wireless communication module is provided in the HMD 21, the HMD 21 may communicate directly with the vehicle head unit 10 through local wireless communication.

For example, the HMD 21 may receive changed vehicle proceeding direction information and information regarding the rotating direction and rotating angle of the vehicle from the vehicle head unit 10 through local wireless communication. Further, if the deviation of the driver's gaze is sensed, the HMD 21 may transmit a message notifying of deviation of the driver's gaze to the vehicle head unit 10 through local wireless communication.

Figure 2:
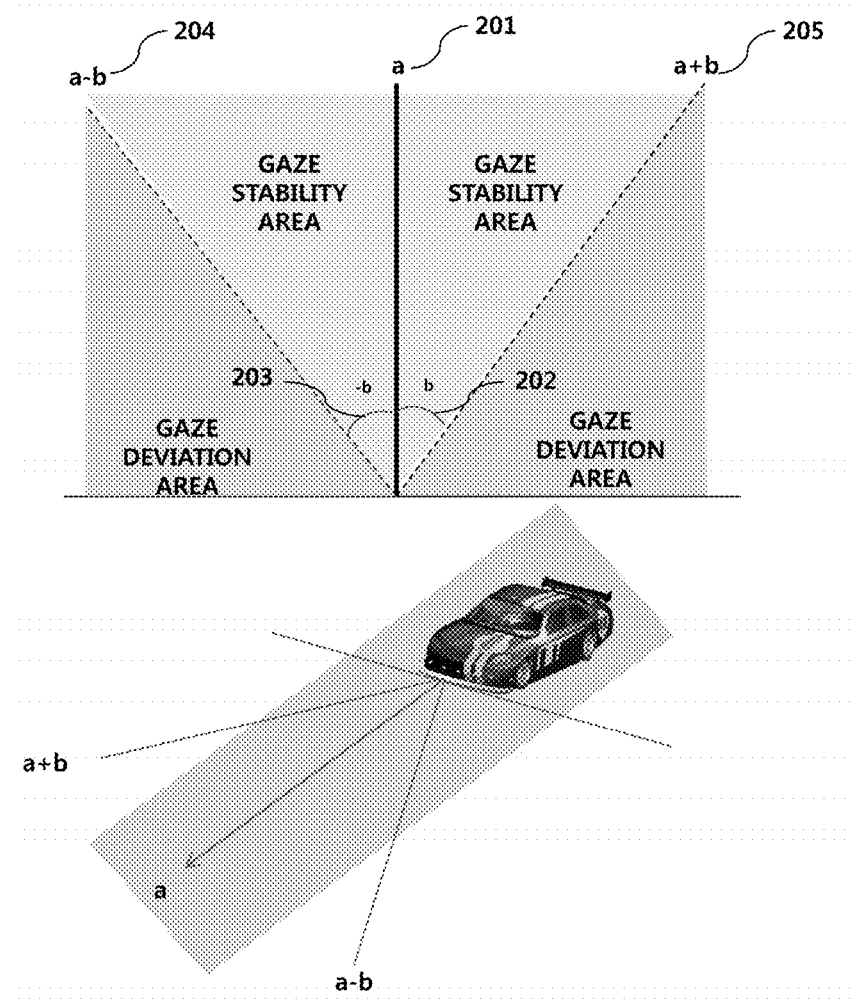
FIG. 2 is a view illustrating a criterion to determine deviation of a driver's gaze in accordance with an embodiment of the present inventive concept.

FIG. 2 is a view illustrating a criterion to determine deviation of a driver's gaze in accordance with an embodiment of the present inventive concept.

With reference to FIG. 2, the HMD 21 may sense the direction of a driver's gaze using a geomagnetic field sensor, a gaze sensor, and the like and determine whether or not the driver's gaze deviates from a gaze stability area by comparing the sensed direction of the driver's gaze with a gaze deviation allowable angle.

A reference direction to determine whether or not the driver's gaze deviates from the gaze stability area is the vehicle driving (proceeding) direction a 201, i.e., a direction which the front surface of the vehicle faces. If the direction of the driver's gaze does not deviate rightward or leftward from the direction a 201 by an allowable angle b 202 or 203, the HMD 21 determines that the driver's gaze is located in the gaze stability area. Therefore, the gaze deviation allowable angle is a value between a−b 204 and a+b 205.

If the driver's gaze deviates from the gaze deviation allowable angle or is located in a gaze deviation area, the HMD 21 may sense the deviation of the driver's gaze and transmit a designated control signal informing of deviation of the driver's gaze to the vehicle head unit 10.

Figure 3:
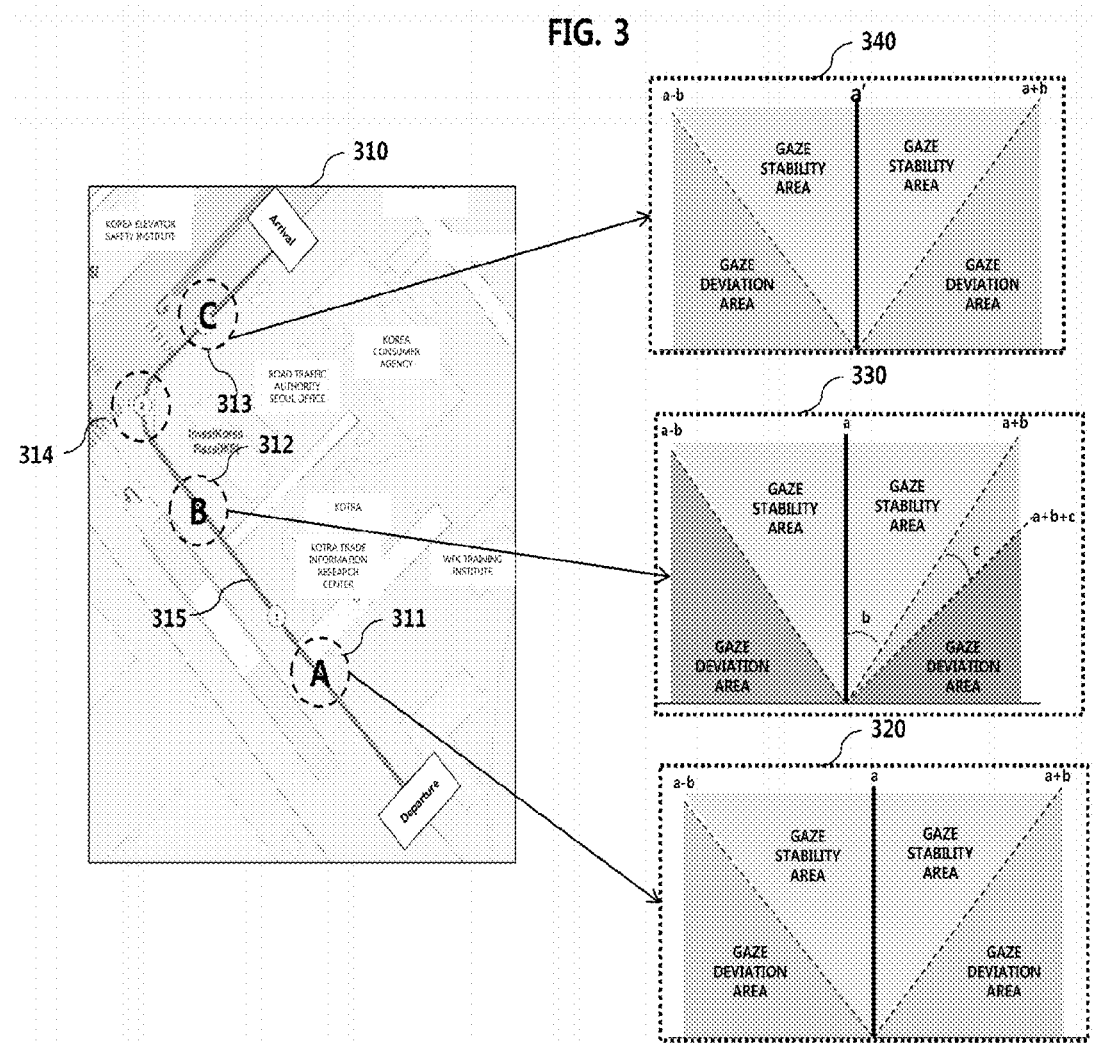
FIG. 3 is a view illustrating a method for changing a gaze deviation allowable angle according to rotation of a vehicle in accordance with an embodiment of the present inventive concept.

FIG. 3 is a view illustrating a method for changing a gaze deviation allowable angle according to rotation of a vehicle in accordance with an embodiment of the present inventive concept.

The gaze deviation allowable angle applied to the present disclosure may be dynamically changed according to a driving path. For example, if vehicle rotation in the front area is required during guidance of driving, the gaze deviation allowable angle may be increased. Here, vehicle rotation may include leftward rotation, rightward rotation, U-turn, and the like.

Further, the gaze deviation allowable angle may be adaptively determined according to the rotating direction and rotating angle of the vehicle.

With reference to FIG. 3, if a vehicle is driving at a position A 311 on a driving guiding path 315, a gaze deviation allowable angle corresponding to the position A 311 may be a value between a−b and a+b, as shown in an area 320.

If the vehicle approaches a position B 312 and requires rightward rotation, a gaze deviation allowable angle corresponding to the position B 312 may be a value between a−b and a+b+c, as shown in an area 330. Here, the value c may be increased in inverse proportion to a remaining distance up to a rotation position 314. Further, the value c may be increased in direct proportion to a rotating angle of the vehicle at the rotation position 314.

When the vehicle completes the rightward rotation and is located at a position C 313, a gaze deviation allowable angle corresponding to the position C 313 may be a value between a'−b and a'+b, as shown in an area 340. It is understood that the vehicle driving direction is changed, and thus, the reference direction to determine deviation of the driver's gaze is changed from a to a'.

Figure 4:
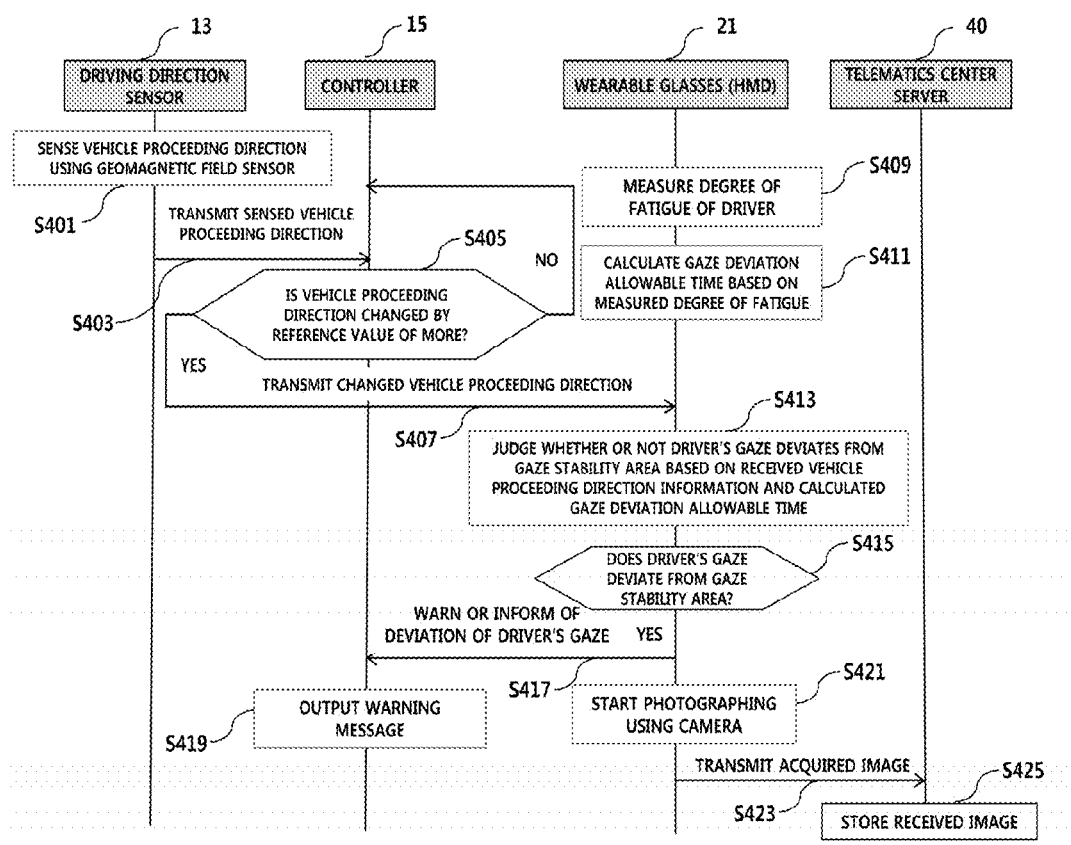
FIG. 4 is a flowchart illustrating a procedure for monitoring a driver status using a head mounted display (HMD) in accordance with an embodiment of the present inventive concept.

FIG. 4 is a flowchart illustrating a procedure for monitoring a driver status using a head mounted display (HMD) in accordance with an embodiment of the present inventive concept.

With reference to FIG. 4, the driving direction sensor 13 of the vehicle head unit 10 may sense a current vehicle proceeding direction using a geomagnetic field sensor or a sensing function to sense the vehicle driving (proceeding) direction (S401).

The driving direction sensor 13 may transmit the sensed information regarding the vehicle proceeding direction to the controller 15 at a designated period (S403). For example, the vehicle proceeding direction may be calculated based on the North direction of a compass. As one example, if the vehicle proceeds in a direction of 30 degrees to the East based on the North direction, the vehicle proceeding direction information may be E30. As another example, if the vehicle proceeds in a direction of 120 degrees to the West based on the North direction, the vehicle proceeding direction information may be W120.

The controller 15 determines whether or not a difference between a received vehicle proceeding direction and a formerly received vehicle proceeding direction, i.e., a change in the vehicle proceeding direction, exceeds a designated reference value (S405).

As a result of determination, if the change in the vehicle proceeding direction exceeds the reference value, the controller 15 may transmit the changed vehicle driving direction information to the HMD 21 through local wireless communication (S407).

The HMD 21 may start measurement of a degree of fatigue of the driver by sensing wearing of wearable glasses by the driver, receiving a designated fatigue measurement start control message from the vehicle head unit 10 or receiving a designated user input on the HMD 21 (S409).

Here, the degree of fatigue of the driver may be calculated by Equation 1 below.

$$\beta = -\frac{EyeClosing Time \times NumberofTimesofEyeBlinking}{\beta r} \quad \text{[Equation 1]}$$

Wherein, β means a degree of fatigue and βr means a fatigue constant.

That is, when measurement of the degree of fatigue of the driver starts, the HMD 21 may measure the degree of fatigue of the driver by calculating the number of times of eye blinking of the driver wearing the wearable glasses for a unit time and the eye closing time of the driver for the corresponding unit time.

Further, the HMD 21 may calculate a gaze deviation allowable time based on the measured degree of fatigue (S411). Here, the gaze deviation allowable time may be calculated by Equation 2 below.

$$T = -\frac{Tr}{\beta} \quad \text{[Equation 2]}$$

Where, T means a gaze deviation allowable time, Tr means a gaze deviation constant, and β means a degree of fatigue.

According to Equation 2 above, it may be understood that the gaze deviation allowable time T decreases as the degree of fatigue β increases. Thereafter, the HMD 21 may determine whether or not the driver's gaze deviates from the gaze stability area using the vehicle proceeding direction information received in operation S407, the calculated gaze deviation allowable time T and the like (S413 and S415).

As a result of determination, upon determining that the driver's gaze deviates from the gaze stability area, the HMD 21 may transmit a designated control message which informs the deviation of the driver's gaze, hereinafter, referred to as a "driver gaze deviation warning message", to the controller 15 of the vehicle head unit 10 (S417). In this case, when the controller 15 receives the driver gaze deviation warning message, the controller 15 may output a designated warning message (S419). As one example, the controller 15 may output a warning message on the display screen through the output 11 or output a designated warning sound or a warning guidance message through a speaker. As another example, the controller 15 may vibrate the driver's seat or may flicker an emergency light.

After transmission of the driver gaze deviation warning message, the HMD 21 may drive a front camera provided in the HMD 21 to start photographing of a front area and transmit an acquired image to the telematics center server 40 through the mobile communication network 30 (S421 and S423).

The telematics center server 40 stores the received image in the driving image storage database 42 (S425).

Figure 5:
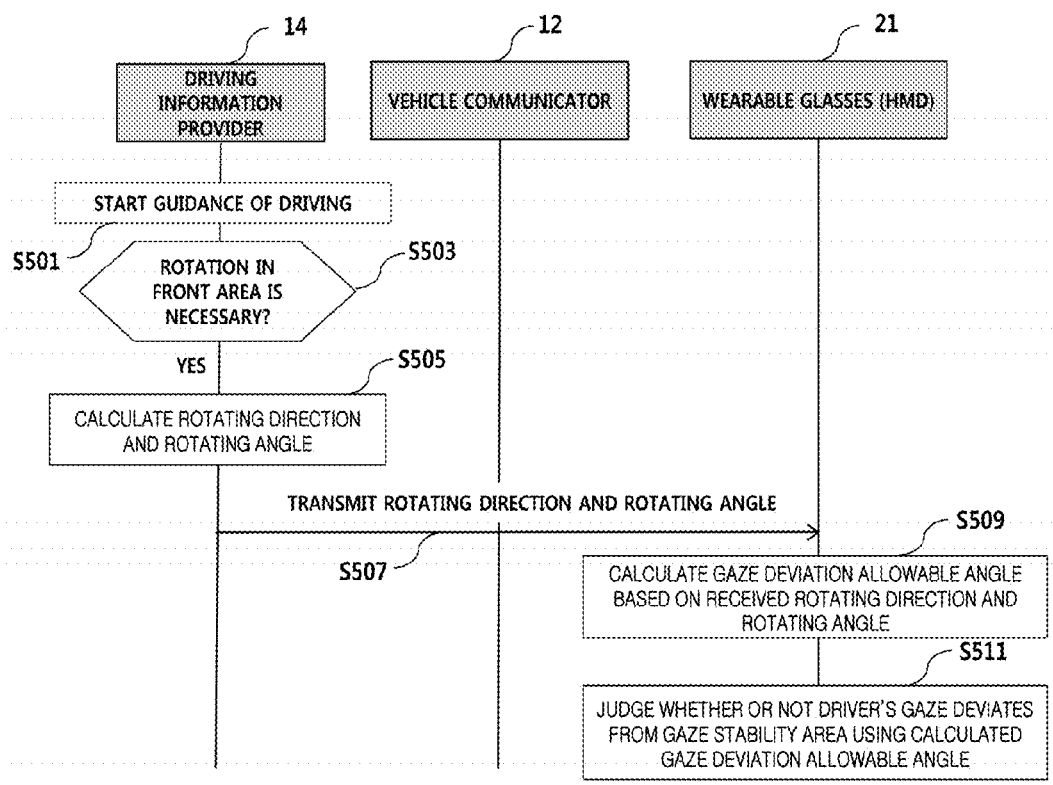
FIG. 5 is a flowchart illustrating a procedure for adaptively changing a gaze deviation allowable angle during driving in accordance with an embodiment of the present inventive concept.

FIG. 5 is a flowchart illustrating a procedure for adaptively changing the gaze deviation allowable angle during driving in accordance with an embodiment of the present inventive concept.

With reference to FIG. 5, when guidance of driving is started, the driving information provider 14 of the vehicle head unit 10 determines whether or not rotation of the vehicle in a front area is necessary (S501 and S503).

As a result of determination, upon determining that rotation of the vehicle in the front area is necessary, the driving information provider 14 calculates a rotating direction and a rotating angle (S505).

The driving information provider 14 transmits the rotating direction and the rotating angle information to the HMD 21 through the vehicle communicator 12 (S507).

The HMD 21 may calculate a gaze deviation allowable angle based on the received rotating direction and rotating angle and determine whether or not a driver's gaze deviates from a gaze stability area using the calculated gaze deviation allowable angle (Operations S509 and S511).

As apparent from the above description, a method and apparatus in accordance with the present disclosure will have effects, as follows.

The present disclosure provides a method and apparatus for monitoring a driver status using an HMD which may monitor the driver status in real time, determine whether or not a driver's gaze deviates from a gaze stability area, and notify the driver of deviation of the driver's gaze, thereby facilitating safe driving.

In addition, the present disclosure provides a method and apparatus for monitoring a driver status using an HMD which may adaptively calculate a gaze deviation allowable angle according to whether or not vehicle rotation is necessary during guidance of driving and determine whether or not a driver's gaze deviates from a gaze stability area using the calculated gaze deviation allowable angle.

Further, the present disclosure provides a method and apparatus for monitoring a driver status using an HMD which may transmit an image acquired by the HMD to a server when deviation of a driver's gaze is confirmed, so that a driver may check the image later, thus improving driving safely.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

What is claimed is:

1. A method for monitoring a driver status in a terminal which interworks with a vehicle head unit through local wireless communication, the method comprising steps of:
receiving, by a controller, vehicle proceeding direction information from the vehicle head unit;
measuring, by the controller, a degree of fatigue of the driver, according to $$\beta = -\frac{EyeClosingTime \times NumberofTimesofEyeBlinking}{\beta r},$$

where β is the degree of fatigue of the driver, βr is a fatigue constant, EyeClosingTime is an eye closing time of the driver for a unit time, and NumberofTimesofEyeBlinking is a number of times of eye blinking of the driver for the unit time;
calculating, by the controller, a gaze deviation allowable time based on the measured degree of fatigue;
determining, by the controller, whether or not a driver's gaze deviates from a gaze stability area using the vehicle proceeding direction information; and
transmitting, by the controller, a driver's gaze deviation warning message to the vehicle head unit, upon determining that the driver's gaze deviates from the gaze stability area,
wherein the gaze deviation allowable time is calculated by dividing a gaze deviation constant by the degree of fatigue, according to $$T = -\frac{Tr}{\beta},$$

where T is the gaze deviation allowable time and Tr is the gaze deviation constant.

2. The method according to claim 1, further comprising a step of photographing a front area by driving a camera mounted in a vehicle, upon determining that the driver's gaze deviates from the gaze stability area.

3. The method according to claim 2, further comprising transmitting an image acquired by photographing to a server through a mobile communication network.

4. The method according to claim 3, wherein the terminal interworks with a second terminal through the local wireless communication, and the image acquired by photographing is transmitted to the server through the second terminal.

5. The method according to claim 1, wherein the degree of fatigue increases in direct proportion to the number of times of eye blinking of the driver for a unit time and the eye closing time of the driver for the unit time.

6. The method according to claim 1, wherein the gaze deviation allowable time decreases when the degree of fatigue increases.

7. The method according to claim 1, wherein the vehicle proceeding direction information includes at least one of current proceeding direction information, rotating direction information on a driving path, and rotating angle information of a corresponding vehicle.

8. The method according to claim 7, further comprising a step of calculating a gaze deviation allowable angle based on the vehicle proceeding direction information,
wherein it is determined that the driver's gaze deviates from the gaze stability area by comparing a time when the driver's gaze deviates from the gaze deviation allowable angle with the gaze deviation allowable time.

9. The method according to claim 8, wherein the driver's gaze is sensed using at least one of a geomagnetic field sensor and a gaze sensor provided in the terminal.

10. The method according to claim 1, wherein the terminal is a wearable eye glasses device.

11. The method according to claim 1, wherein the local wireless communication is one of Wi-Fi communication, Bluetooth communication, infrared data association (IrDA), ultrawideband (UWB) communication, ZigBee communication, and radio frequency identification (RFID) communication in a vehicle.

12. The method according to claim 1, wherein the vehicle proceeding direction information includes proceeding direction information of a vehicle and rotating direction information of the vehicle at a rotation point, and a gaze deviation allowable angle in a rotating direction based on a proceeding direction of the vehicle increases as the vehicle approaches the rotation point.

13. The method according to claim 1, wherein the vehicle proceeding direction information is received from the vehicle head unit if a proceeding direction of a vehicle is changed by a reference value or more.

14. A non-statutory computer-readable medium comprising executable instructions which cause an apparatus for monitoring a driver status by interworking with a vehicle head unit through local wireless communication to perform following functions of:
   receiving vehicle proceeding direction information from the vehicle head unit;
   measuring a degree of fatigue of the driver, according to $$\beta = -\frac{EyeClosingTime \times NumberofTimesofEyeBlinking}{\beta r},$$

where β is the degree of fatigue of the driver, βr is a fatigue constant, EyeClosingTime is an eye closing time of the driver for a unit time, and NumberofTimesofEyeBlinking is a number of times of eye blinking of the driver for the unit time;
   calculating a gaze deviation allowable time based on the measured degree of fatigue;
   determining whether or not a driver's gaze deviates from a gaze stability area using the vehicle proceeding direction information; and
   transmitting a driver's gaze deviation warning message to the vehicle head unit, upon determining that the driver's gaze deviates from the gaze stability area,
   wherein the gaze deviation allowable time is calculated by dividing a gaze deviation constant by the degree of fatigue, according to $$T = -\frac{Tr}{\beta},$$

where T is the gaze deviation allowable time and Tr is the gaze deviation constant.

15. A system for monitoring a driver status, the system comprising:
   a vehicle head unit configured to sense a vehicle proceeding direction and to transmit information regarding the sensed vehicle proceeding direction through local wireless communication; and
   a terminal configured to receive the information regarding the vehicle proceeding direction through the local wireless communication, to determine whether or not a driver's gaze deviates from a gaze stability area using the received information regarding the vehicle proceeding direction information, and to transmit a driver's gaze deviation warning message to the vehicle head unit as a result of determination,
   wherein the terminal measures a degree of fatigue of the driver, and calculates the gaze deviation allowable time based on the measured degree of fatigue, where $$\beta = -\frac{EyeClosingTime \times NumberofTimesofEyeBlinking}{\beta r},$$

where β is the measured degree of fatigue of the driver, βr is a fatigue constant, EyeClosingTime is an eye closing time of the driver for a unit time, and NumberofTimesofEyeBlinking is a number of times of eye blinking of the driver for the unit time,
   wherein the gaze deviation allowable time is calculated by dividing a gaze deviation constant by the degree of fatigue, according to $$T = -\frac{Tr}{\beta},$$

where T is the gaze deviation allowable time and Tr is the gaze deviation constant.

16. The system according to claim 15, further comprising a server configured to receive an image acquired by a front camera of the terminal through a mobile communication network, upon determining that the driver's gaze deviates from the gaze stability area.

17. The system according to claim 16, wherein the vehicle head unit includes:
   an output configured to generate visual, auditory, or tactile senses output and including a display module, a sound output module, and an alarm module;
   a vehicle communicator configured to transmit/receive data to/from the terminal and to transmit/receive information to and from the server through connection with the mobile communication network;
   a driving direction sensor configured to sense a driving direction of a vehicle;
   a driving information provider configured to determine whether or not vehicle rotation in a front area is necessary during guidance of driving and inform a determination result; and
   a controller configured to transmit a designated control signal to the terminal.

18. The system according to claim 16, wherein the terminal includes:
   a head mounted device (HMD) configured to communicate directly with the server through the mobile communication network or to communicate directly with the vehicle head unit through the local wireless communication.

19. The system according to claim 16, wherein the server includes a driving image storage database configured to store received image.

* * * * *